United States Patent [19]

Strosser et al.

[11] Patent Number: 4,639,666
[45] Date of Patent: Jan. 27, 1987

[54] METAL DETECTOR SENSITIVITY ADJUSTMENT AND TEST ASSEMBLY

[75] Inventors: Richard P. Strosser, Akron; Carl E. Bohman, New Holland; Mark K. Chow, Leola, all of Pa.

[73] Assignee: New Holland, Inc.

[21] Appl. No.: 644,422

[22] Filed: Aug. 27, 1984

[51] Int. Cl.⁴ ............... G01R 35/00; G01N 27/72; A01D 75/18
[52] U.S. Cl. .................. 324/202; 56/10.2; 324/239; 340/551
[58] Field of Search ........ 324/200, 202, 228, 239–243, 324/326, 329; 340/551; 455/226

[56] References Cited

U.S. PATENT DOCUMENTS

| | | | |
|---|---|---|---|
| 3,764,860 | 10/1973 | Scheda | 340/551 X |
| 3,959,953 | 6/1976 | Garrott | 56/10.2 |
| 3,972,156 | 8/1976 | Bennett, Jr. et al. | 56/10.2 |
| 4,084,135 | 4/1978 | Enabnit | 324/202 |
| 4,245,352 | 1/1981 | Karpowycz et al. | 455/226 |
| 4,288,748 | 9/1981 | Kaye et al. | 324/326 |
| 4,433,528 | 2/1984 | Bohman | 56/10.2 |

OTHER PUBLICATIONS

Nakane et al, "Standard Magnetic Field Radiated . . . in a Coplane"; CPEM 82 Digest; Conference on Precision Electromagnetic Measurements, Boulder, Colo. USA, Jun. 28–Jul. 1, 1982, pp. 5–7.
Instructions for Metal Detector Test Set IMDTS (Harvester)–150–579P.
Operator's Manual with Assembly Information, Forage Harvester 892 Electronic Metal Detector, Sperry New Holland, 1982.

Primary Examiner—Gerard R. Strecker
Attorney, Agent, or Firm—Griffin, Branigan, & Butler

[57] ABSTRACT

The metal detector circuitry for a forage harvester is provided with a socket for receiving a pluggable unit, the arrangement being such that a resistor in the pluggable unit is connected into the detection circuitry of a metal detector whereby the sensitivity of the metal detector may be changed by inserting into the socket a pluggable unit containing a resistor of a different value. A metal detector test assembly connected to the metal detector through the socket, provides a means for testing the sensitivity of the metal detector and its associated circuitry. The test assembly includes a signal unit which is placed adjacent the metal detector sensing unit and generates a magnetic field that is sensed by the sensing unit, and a test box with circuitry, indicators and switches for selectively checking the sensitivity of the metal detector and correct operation of its associated circuitry.

18 Claims, 7 Drawing Figures

METAL DETECTOR SENSITIVITY ADJUSTMENT AND TEST ASSEMBLY

BACKGROUND OF THE INVENTION

The present invention relates to improvements in controlling the sensitivity and testing the operation of a metal detector apparatus of the type disclosed in U.S. Pat. Nos. 4,433,528 and 3,972,156.

The above-mentioned patents disclose a metal detector apparatus suitable for use in a forage harvester for protecting the crop processing unit. The crop processing unit includes a crop cutter head which rotates at high speed to cut or chop the crop, and if hard metal objects were to be fed into the crop processing unit the blades of the cutter head could be severely damaged. Even small objects which may pass through the crop processing unit without damaging the unit may harm livestock if the crop is used for feed. To prevent the passage of ferrous metal objects into or through the crop processing unit Bohman U.S. Pat. No. 4,433,528 provides a metal detector for detecting objects and stopping the crop feed mechanism before the objects are fed to the cutterhead.

The Bohman device detects all ferrous metal objects above a given size, the particular size being determined by the sensitivity to which the detector circuitry is designed during manufacture. In some instances it may be desirable for the operator to change the sensitivity of the detector circuitry. For example, the detector circuitry should be set for high sensitivity so as to detect all ferrous metal objects if the crop to be harvested is to be used as a feed for livestock. On the other hand, if the crop is to be used for other purposes, the sensitivity should be set lower so that small metal objects, too small to damage the cutterhead, may pass through the detector without tripping the mechanism which stops the crop feed.

Therefore, one object of the invention is to provide a simple and expeditious way of changing the sensitivity of a metal detector.

It is essential that the metal detector circuitry and the feed stop mechanism operated thereby be correctly adjusted and in proper operating condition, but presently available methods for testing function and sensitivity are, at best, rather crude and imprecise. For example, one presently used method of testing sensitivity involves replacing the metal detector control box with a test box, operating the harvester feed with pieces of baling wire attached to the feed roll so as to obtain a desired output signal level from the test box, and then reinserting the metal detector control box and operating the feed mechanism with the wire still attached to see if the same output signal level is obtained from the metal detector control box. If the same output signal level is obtained then the circuitry of the metal detector control box is over-sensitive and should be replaced. Clearly, this method of checking sensitivity is timeconsuming and is difficult for an operator to perform unless he is familiar with electrical circuitry. Therefore, a further object of the invention is to provide a simple method and apparatus whereby an operator lacking skills in electronics may check the function and sensitivity of a metal detector.

SUMMARY OF THE INVENTION

An object of the present invention is to provide a plurality of pluggable units, each containing a resistance of a different value, and a receptacle for receiving a pluggable unit, the receptacle being connected to a threshold circuit in the detector so that the resistance in the pluggable unit sets the threshold below which a signal from the sensing unit will not cause the detector to produce an output signal when a metal object is sensed.

An object of the present invention is to provide a novel method of changing the sensitivity of a metal detector by removing from a socket a pluggable element containing a resistance of one value and inserting into the socket a pluggable element containing a resistance of a second value.

Another object of the invention is to provide a novel method and apparatus for testing the function and sensitivity of a metal detector located in a feed roll of a forage harvester by generating a magnetic field of a given intensity in the vicinity of the sensing coils of the detector and sensing the magnitude of the output signal produced by the detector in response to the generated magnetic field. In accordance with this aspect of the invention, a test box is provided for generating a "standard" pulsating current which is applied to a coil in a signal generating unit to produce a standard pulsating magnetic field. The signal generating unit is held in the region of the metal detector and the sensing coils in the metal detector sense the pulsating magnetic field and produce signals that are processed by the electronic circuits of the metal detector before being applied to the test box. The test box includes an indicator in the form of a bar graph which generates a visual indication of the magnitude of the output signals produced by the metal detector in response to the standard pulsating magnetic field.

Another object of the invention is to provide a test apparatus as described above wherein the test box includes means for selecting the standard current generated, thereby permitting the testing of the metal detectors in harvesters wherein the feed rolls in which the metal detectors are mounted have different diameters.

A further object of the invention is to provide a testing apparatus as described above and including further means for conducting a voltage check, a trip check or other checks whereby operation of the metal detector and certain electrical control circuits of a forage harvester may be tested to locate or isolate the cause of a malfunction in the metal detector or the control circuits.

Other objects of the invention and its mode of operation will become apparent upon consideration of the following description and the accompanying drawings wherein like reference numerals are used throughout to designate the same part.

DETAILED DESCRIPTION OF THE INVENTION

Overview

Figure 1:
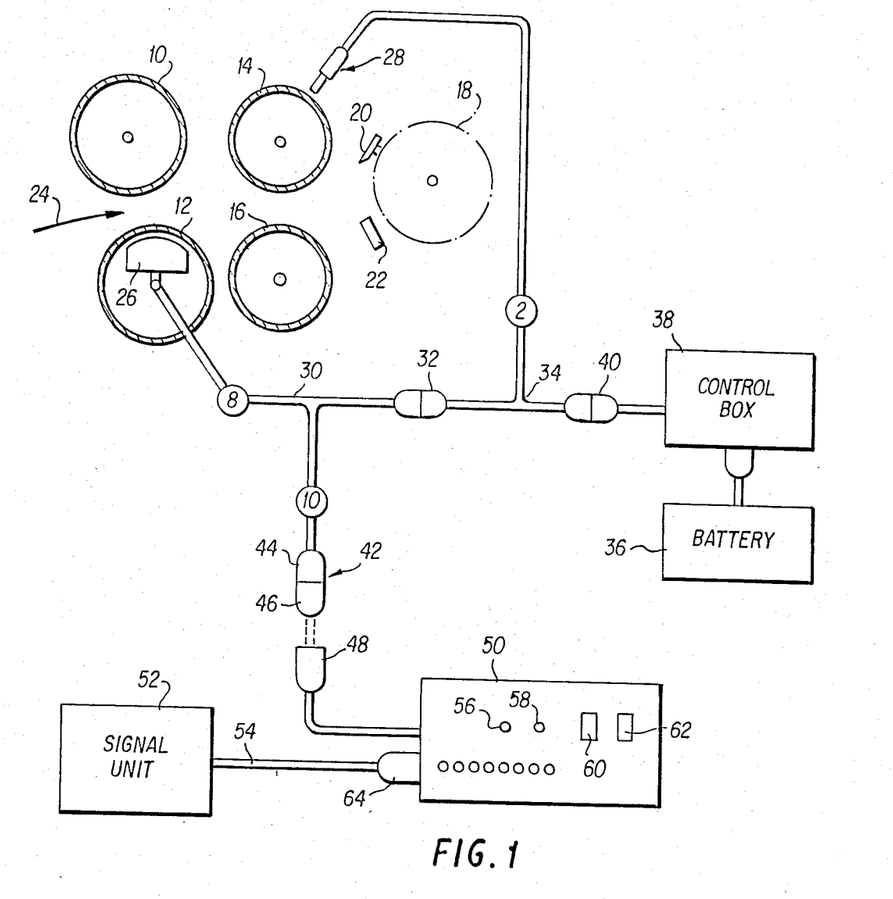
FIG. 1 is a schematic diagram illustrating a forage harvester feed mechanism with a metal detector in combination with a test unit and signal generating unit.

FIG. 1 schematically illustrates a forage harvester of the type shown in U.S. Pat. Nos. 3,959,953 and 3,972,165 and includes upper and lower front feed rolls 10 and 12, upper and lower rear feed rolls 14 and 16, and a rotating cutting head 18. The cutting head 18 carries a plurality of cutting elements 20, one of which is illustrated in FIG. 1. The cutting elements cooperate with a shear bar 22 to cut or chop the crop material. An attachment (not shown) cuts the crop and feeds it in the direction of arrow 24 into the front feed rolls 10,12 which pass it on to the rear feed rolls 14,16. The crop material is then cut at the shear bar 22 and fed between the bar and cutter head 18 to a discharge mechanism (not shown) which discharges the material from the harvester.

The harvester of FIG. 1 is provided with a metal detector assembly 26. The metal detector assembly 26 is mounted within lower front feed roll 12 and provides a means for detecting ferrous metal objects as they pass between the front feed rolls 10 and 12. The metal detector assembly includes a plurality of magnets, sensing coils and electronic circuitry for processing a signal induced in the sensing coils when the magnetic field generated by the magnets is altered by a metal object passing between the front feed rolls. The metal detector may be of the type shown in U.S. Pat. No. 3,972,156 having a pair of sensing coils as shown in U.S. Pat. No. 4,433,528.

The mechanism for driving the feed rolls and cutter head is illustrated in U.S. Pat. No. 3,959,953. This mechanism includes a ratchet wheel which cooperates with a spring biased solenoid-actuated bar or pawl and this pawl and its solenoid are represented in FIG. 1 by the reference numeral 28. As long as no metal object is detected by metal detector 26 the solenoid actuated pawl is energized thus holding the pawl out of engagement with the ratchet wheel. When a metal object is detected the solenoid actuated pawl is released, and the spring biases the pawl into engagement with the ratchet wheel thus stopping the feed roll drive mechanism. A slip clutch is provided so that the stopping of the feed roll drive mechanism does not damage the drive train of the harvester.

The metal detector 26 is powered by a battery 36. This battery may be the battery that supplies 12V electrical power to the tractor which pulls the harvester. The battery 36 is connected to a control box 38 which is mounted in a position convenient to the operator of the tractor. The control box 38 contains various control circuits and indicators, the details of which are not essential to an understanding of the present invention but are disclosed in the publication entitled "Operator's Manual with Assembly Information, Forage Harvester 892 Electronic Metal Detector" published by Sperry New Holland, a division of Sperry Corporation. However it should be noted that battery power is connected through control box 38, a connector 40, wiring harness 34, connector 32, wiring harness 30, a connector 42, and back into wiring harness 30 to the metal detector assembly 26, the connector 42 being provided in accordance with one aspect of the present invention. In addition, the output signal from the metal detector assembly 26 does not directly energize solenoid-actuated pawl 28 but instead controls a relay in the control box 38, the relay in turn controlling application of battery power to the solenoid-actuated pawl and to audible and visual alarms in the control box.

The connector 42 comprises a socket or receptacle 44 and a pluggable element 46, the purpose of which is subsequently explained. The pluggable element 46 may be removed and a test plug 48 inserted into the receptacle 44 when it is desired to test the sensitivity of the metal detector and/or check the operation of the metal detector circuits. The apparatus for testing the sensitivity and operation of the metal detector comprises a test unit 50 connected to a signal generating unit 52 by a cable 54. The test unit 50 includes a housing or cabinet for housing test circuits subsequently described with reference to FIG. 5. Eight indicator lights 1-8, which may be LEDs, are visible on the front panel of the housing and provide an indication of the sensitivity of the metal detector in response to a standard pulsating magnetic field generated by signal generating unit 52 in the vicinity of the metal detector sensing coils. Two further indicator lights 56 and 58 are visible on the front panel of the test unit housing. Indicator light 56 is a "power on" indicator. This light is normally on when a proper battery voltage is available to the test unit, and flashes at a low rate if the battery power drops below a given threshold. Indicator light 58 is a "detect" indicator. It flashes when the metal detector 26 senses the presence of a metal object or produces an output signal during testing.

Two manually operated switches 60 and 62 are provided on the front panel of the test unit. The switch 60 is a "model" switch which is set to one position or the other depending on the model of the harvester on which the metal detector undergoing testing is mounted. The switch 62 is a three-position "pawl switch" which is used to selectively energize the solenoid actuated pawl 28 as hereinafter described.

The signal generating unit 52 comprises a coil of approximately 800 turns of wire wound within a groove extending around a suitable core. The coil is connected to the test unit 50 by a cable 54 and a phono-jack 64. During a sensitivity test, the signal generating unit 52 is held against the lower front feed roll 12 and the feed roll is manually rotated back and forth, the feed roll drive being disconnected prior to the test procedure. The signal generating unit 50 generates a standard pulsating current which is applied to the signal generating unit 52 thereby generating a standard pulsating magnetic field of predetermined intensity in the region of the sensing coils of the metal detector. As the feed roll is manually rotated the output of the sensing coils, and thus the output signal of the metal detector 26 varies. This signal is applied to the test unit 50 where it causes one or more of the indicators 1-8 to be lit, depending on the magnitude of the signal from the metal detector. This provides an indication of the sensitivity of the metal detector. The details of the test unit and its use in performing various tests will be explained after certain details of a typical metal detector are explained.

Typical Metal Detector

Figure 2:
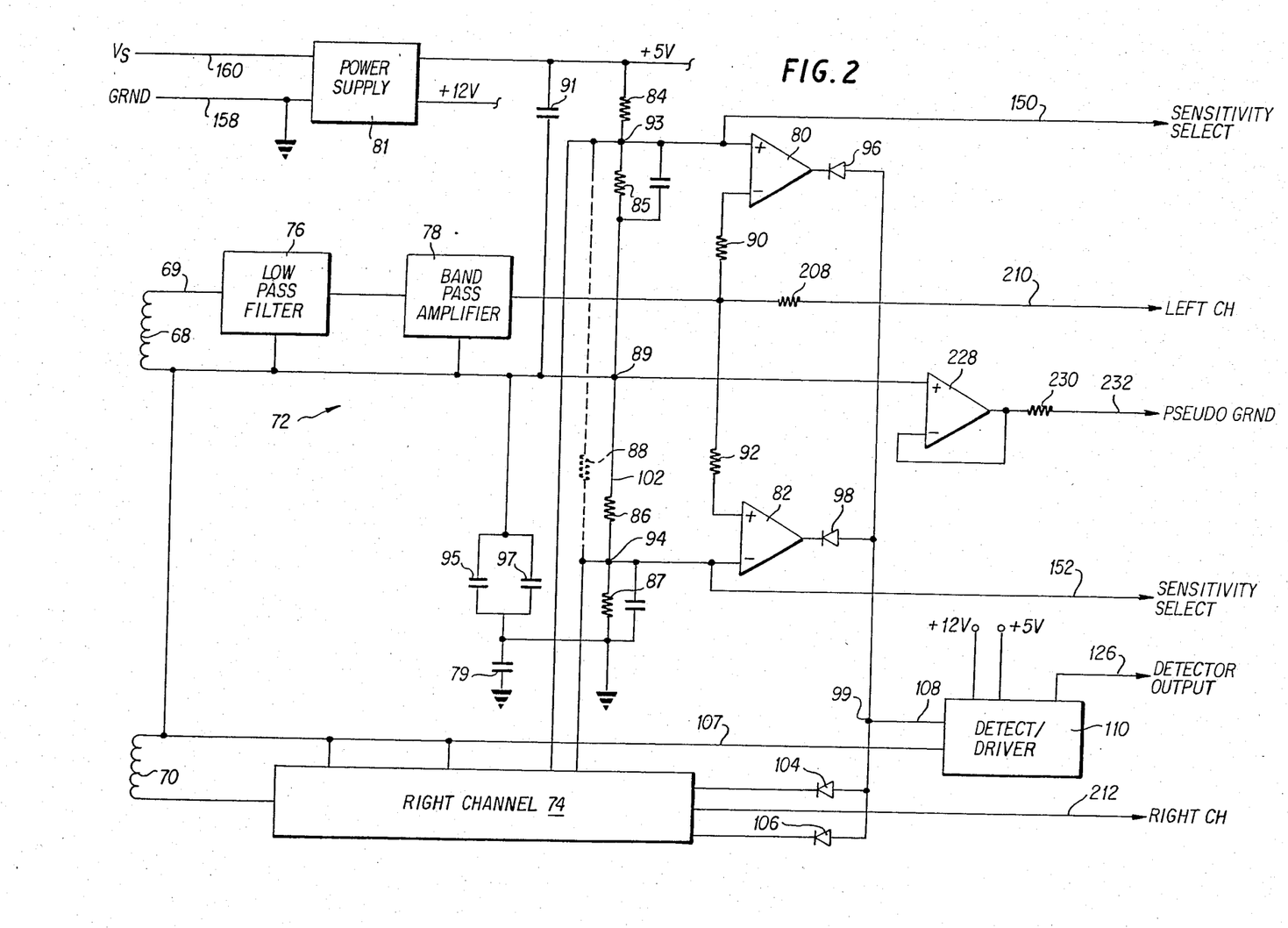
FIG. 2 shows a typical metal detector circuit with which the present invention may be utilized.

FIG. 2 shows a typical metal detector suitable for use in detecting metal inadvertently ingested into a forage harvester. Permanent magnets (not shown) positioned within the lower front feed roll as shown in U.S. Pat. No. 4,433,528 produce a magnetic field and two sensing coils 68 and 70 are positioned within the feed roll and in the magnetic field. When a ferrous metal object passes over the front feed roll it disturbs the magnetic field and induces a current in one or both of the coils 68 and 70.

A signal induced in coil 68 is fed to a left channel 72 and a signal induced in coil 70 is fed to a right channel 74. The two channels are identical and may be of the type shown in Bennett et al. U.S. Pat. No. 3,972,156. Certain details of left channel 72 are shown in FIG. 2 to illustrate the relationship between the metal detector circuitry and the present invention.

The channel 72 includes a low pass filter 76, a band pass amplifier 78 and a threshold detector comprising first and second comparators 80 and 82. A voltage divider network comprising four equal series connected 10K resistors 84, 85, 86 and 87 is connected between ground and the +5V output of the metal detector power supply 81 so that a junction point 89 between resistors 85 and 86 is always at +2.5V. The junction 89 is connected to one end of each of the sensing coils 68 and 70. The junction 89 is also connected through appropriate resistances to the non-inverting inputs of amplifiers included within low pass filter 76 and band pass amplifier 78, thereby providing a reference voltage or pseudo ground for these elements. In addition, the junction 89 is connected through dc blocking capacitors 95 and 97 to logic ground and logic ground is connected through a capacitor 79 to chassis ground.

As the presence of a piece of metal is sensed by sensing coil 68, the voltage induced therein is applied to the low pass filter 76, the voltage on the input lead 69 to the filter varying about the 2.5V level depending upon the size, velocity and orientation of the metal object detected. The output of low pass filter 76 is applied to band pass amplifier 78, the filter 76 and amplifier 78 operating on the signal from coil 68 in the same manner, and for the same purposes, as explained in U.S. Pat. No. 3,972,156.

The output of amplifier 78 is connected through a resistor 90 to the inverting input of comparator 80, and through a resistor 92 to the noninverting input of comparator 82. The non-inverting input of comparator 80 is connected to the junction 93 between resistors 84 and 85 while the inverting input of comparator 82 is connected to the junction 94 between resistors 86 and 87. Assuming for the moment that the resistor 88 shown in phantom outline does not exist, the reference voltage input to comparator 80 is 3.75V while the reference voltage input to comparator 82 is 1.25V. Thus, the comparator 80 normally produces a high level output signal as long as the output signal from band pass amplifier 78 does not cause a voltage greater than 3.75 volts to be applied to the inverting input of comparator 80. In like manner, the output of comparator 82 is normally at the high level as long as the output of band pass amplifier 78 does not drive the non-inverting input of comparator 82 below 1.25V. Two diodes 96 and 98 are connected between a junction 99 and the outputs of comparators 80 and 82 respectively.

The right channel 74 is identical to the channel described above. The reference voltages for the threshold comparators in channel 74 are supplied over leads 100 and 102 which are connected to the junctions 93 and 94, respectively. The outputs of the threshold comparators in channel 74 are connected to the junction 99 through diodes 104 and 106.

Figures 4, 6:
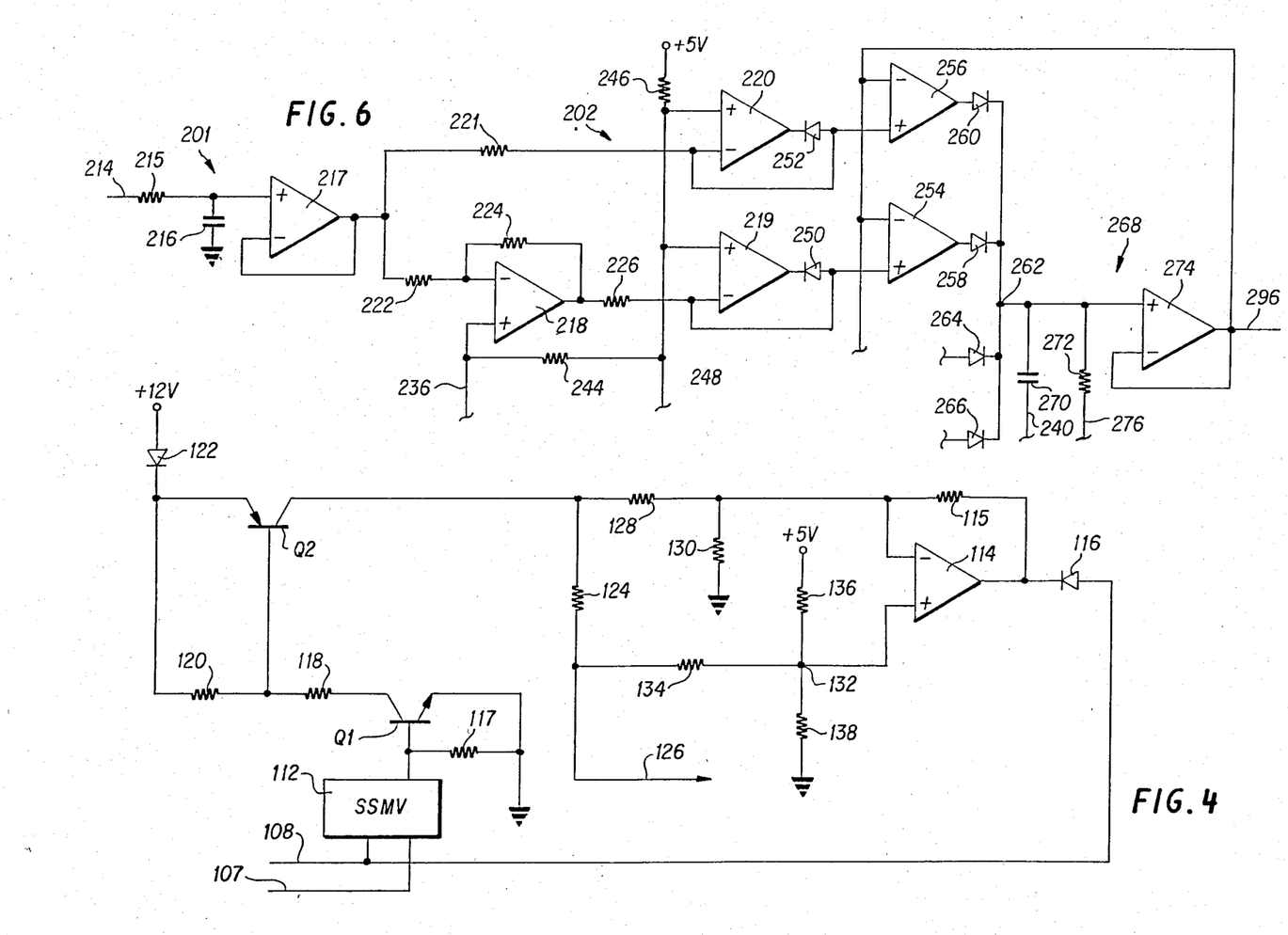
FIG. 4 is a wiring diagram of the detector/drive circuit of FIG. 2.
FIG. 6 is a wiring diagram illustrating details of the buffer, rectifier and peak hold circuits of FIG. 5; and, FIG. 7 is a wiring diagram illustrating details of the detector/driver circuit and level detector of FIG. 5.

The junction 99 is connected by a lead 108 to a detector/driver circuit 110. The circuit 110 is illustrated in FIG. 4 and comprises a single shot multivibrator 112 with noise filtering, first and second transistors Q1 and Q2 and a differential amplifier 114 having an output connected through a diode 116 to the input of multivibrator 112. The output of multivibrator 112 is connected to the base of the transistor Q1. The emitter of transistor Q1 is grounded and its collector is connected through a resistor 118 to the base of transistor Q2 and through a bias resistor 120 to the emitter of transistor Q2. The emitter of Q2 is connected through a diode 122 to +12V which is derived from power supply 81 (FIG. 2). The collector of transistor Q2 is connected through a resistor 124 to the metal detector output lead 126.

Normally, the output of multivibrator 112 enables transistor Q1 so that current flows from +12V toward ground through diode 122, resistors 120 and 118 and transistor Q1. This biases transistor Q2 which then conducts current which flows through resistor 124 and over lead 126 to the control box 38 (FIG. 1) where it energizes a control relay and causes the application of power from battery 36 to the solenoid-actuated pawl 28. This holds the pawl disengaged from a ratchet in the feed roll drive mechanism so that the feed rolls may turn.

When a piece of metal is detected by a sensing coil 68 or 70 (FIG. 2) and this piece of metal is large enough to cause one of the threshold detectors (80,82) in one of the channels to be triggered by the output signal from band pass amplifier 78, then the voltage at junction 99 drops to a low level and triggers multivibrator 112 (FIG. 4). Actually, the multivibrator includes noise rejection circuitry so that the multivibrator is triggered to produce a 250 ms signal only if the voltage at junction 99 drops to a low level for at least 500 microseconds. When the multivibrator is triggered it produces a low level signal which turns transistor Q1 off. When transistor Q1 is turned off it turns off transistor Q2 so that current flow from +12V to lead 126 is terminated. This causes the release of the control relay in control box 38. The relay contacts break the power connection between the battery 36 and solenoid-actuated pawl 28 so that the pawl is freed to move under spring tension into contact with the ratchet in the feed roll drive train thereby stopping the feed rolls. The control relay also initiates audible and visual alarms in the control box 38 to alert the operator to the fact that a piece of metal has been detected.

Returning to FIG. 4, the resistor 124 serves as a current sensing device which causes the multivibrator 112 to be triggered if the current flow through the resistor should become excessive, as might be the case if the lead 126 were shorted to ground or part of the coil of the relay in control box 38 were shorted. One end of resistor 124 is connected through a resistor 128 to the inverting input of differential amplifier 114. This input is also connected to ground through a resistor 130. The other end of resistor 124 is connected to a junction 132 through a resistor 134. The junction 132 is connected through a resistor 136 to +5V, through a resistor 138 to ground, and to the non-inverting input of differential amplifier 114.

The arrangement is such that differential amplifier 114 normally produces a positive output signal which is blocked by diode 116. If a short should develop so that a current greater than a predetermined threshold level should flow through resistor 124, the differential input signal to amplifier 114 becomes greater, the amplifier output signal goes low, and this signal passes through diode 116 to trigger multivibrator 112 thereby turning transistors Q1 and Q2 off and stopping the flow of current through lead 126.

Programmable Sensitivity

As previously explained the sensitivity of the metal detector shown in FIG. 2 is determined by the voltages at junctions 93 and 94, these voltages being applied as reference voltages to the comparators 80 and 82 of the threshold detector. The resistor 88 is utilized only during manufacturing testing, the value of the resistor being determined by the desired sensitivity of the metal detector. For example, a 3K resistor 88 might be connected to junction 93 and jumpered to junction 94 so that one of the threshold detector comparators 80 or 82 is triggered when a signal of, say 2.788V or more or 2.212V or less is produced at the output of band pass amplifier 78. For the metal detector described above the 3K resistor determines the "standard" or nominal sensitivity of the detector. After the manufacturing test, the jumper connecting resistor 88 to junction 94 is removed.

Figure 3:
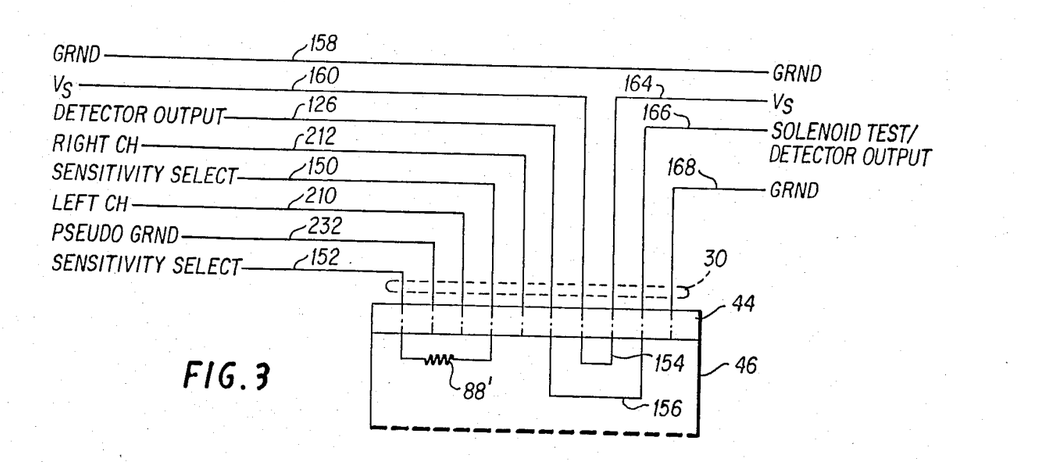
FIG. 3 illustrates the use of a pluggable element to change the sensitivity of the metal detector circuit of FIG. 2.

It has been found desirable, for reasons previously stated, to be able to vary the sensitivity of the metal detector after it leaves the factory. Furthermore, it is desirable that the change in sensitivity be quickly accomplished by one who is not necessarily skilled in electronic circuitry. To accomplish this, the resistor 88 is replaced by a resistor 88' having a different resistance value and mounted in a pluggable element 46 (FIGS. 1 and 3). The junctions 93 and 94 are connected by two leads 150 and 152 to a socket 44 into which the pluggable element 46 may be manually inserted so that when the plug is inserted into the socket the resistor 88' is effectively connected between junctions 93 and 94. By providing a plurality of plugs 46, each containing a different value resistor 88' a harvester operator may quickly change plugs and thereby change the sensitivity of the metal detector to meet a particular need.

To assist the operator in selecting the plug necessary for a desired sensitivity, the plugs may be numbered, color coded or otherwise marked.

The plug 46 illustrated in FIG. 3 is also provided with two jumper wires 154 and 156. Referring to FIG. 2, the metal detector of the prior art had only one output lead 126 and two input leads 158 and 160. All of these leads were connected directly to the connector 32 (FIG. 1). In accordance with one aspect of the present invention the leads 126 and 160 are connected to pins in socket 44. Two leads 164 and 166 are connected between connector 32 and socket 44. The jumper wires 154 and 156 within plug 46 connect lead 160 to lead 164 and lead 126 to lead 166 so that when the plug is inserted into socket 44 battery power is supplied to the metal detector from battery 36 and the metal detector output signal is supplied to the control relay in control box 38 through the plug.

By connecting power to the metal detector through the plug 48, the operation of the metal detector is inhibited if the plug 48 should be accidentally disconnected. This prohibits operation of the harvester feed as described above.

Test Unit

Figure 5:
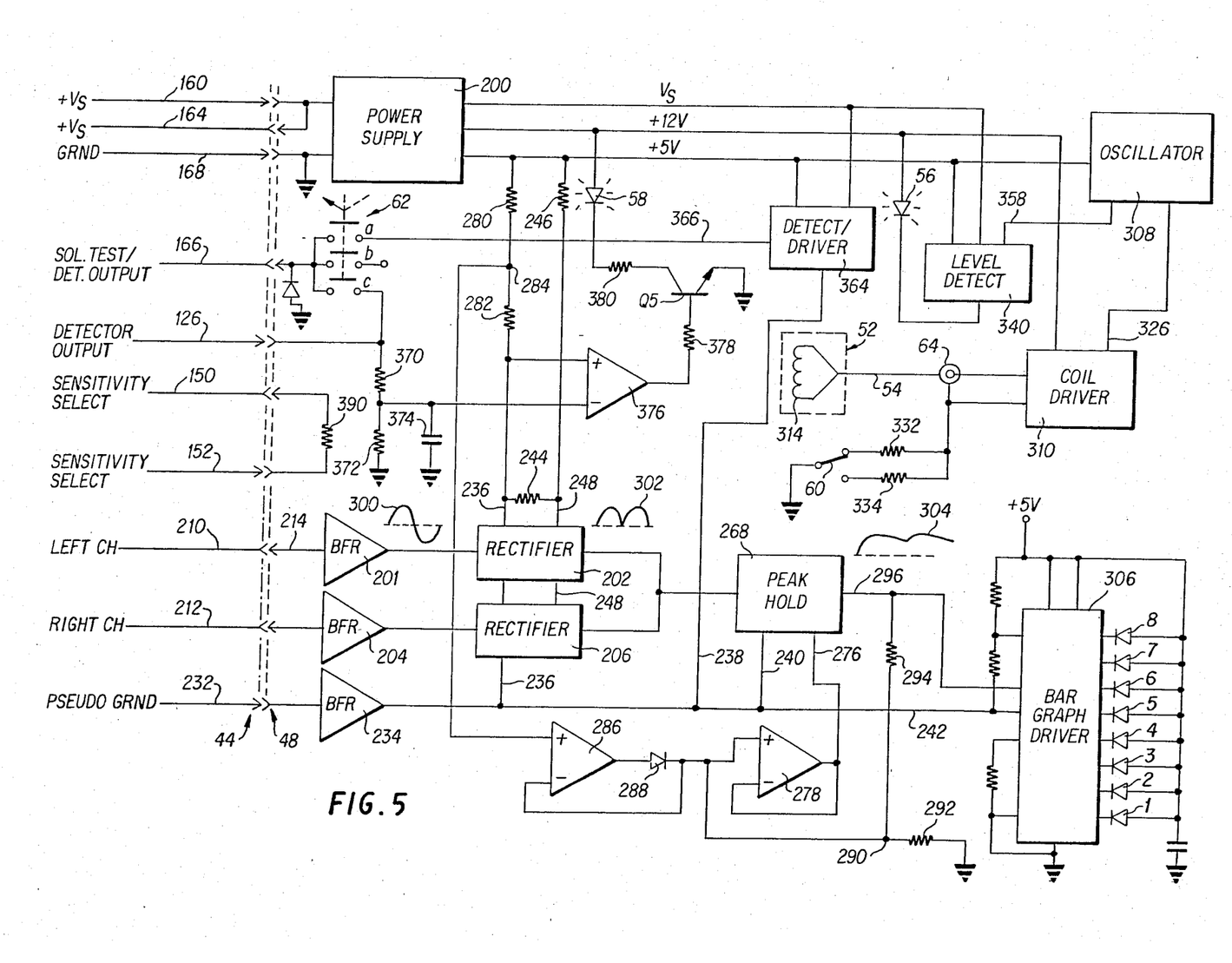
FIG. 5 is a schematic block diagram of the circuits within the test unit.

FIG. 5 illustrates the circuits contained within the test unit 50. All inputs and outputs for the test unit are shown at the left side of FIG. 5 where the connector shown represents the socket and plug 44 and 48 of FIG. 1. The test unit is placed in operation by removing the plug 46 and inserting the plug 48 into socket 44.

The test unit 50 is provided with a power supply 200 which is connected by means of lead 164 in the wiring harness 30 (FIG. 1) and the control box 38 to the battery 36 which supplies $V_s$ of 12 volts. Two pins of plug 48 are jumpered so that leads 160 and 164 are effectively connected together. This insures that $V_s$ as supplied to the test unit and the metal detector has the same value.

The power supply 200 produces three output voltages which are supplied to the various circuits within the test unit. These voltages are $V_s$ which is the unregulated output voltage of battery 36, +12V filtered and +5V regulated.

The test unit includes a left channel comprising a buffer 201 and a full wave rectifier 202, and a right channel comprising a buffer 204 and a full wave rectifier 206. The left and right channels of the test unit separately process signals from the left and right channels of the metal detector. For this purpose the output of the left channel bandpass amplifier 78 in the metal detector (FIG. 2) is connected through a current limiting resistor 208 and by way of a lead 210 to the socket 44 (FIG. 3). The input of buffer 201 is connected to a corresponding pin in plug 48 so that when the plug is inserted in the socket the output of band pass amplifier 78 is applied to buffer 201. By a similar arrangement the band pass amplifier in the right channel of the metal detector is connected via a lead 212 to the input of buffer 204.

The left channel of the test unit is illustrated in FIG. 6 and the right channel may be identical to the left channel. The buffer 201 comprises a resistor 215, a capacitor 216 and a voltage follower 217. The full wave rectifier comprises an amplifier stage 218 and two rectifying amplifiers 219 and 220. The output of voltage follower 217 is applied through a resistor 221 to the inverting input of amplifier 220 and through a resistor 222 to the inverting input of the amplifier 218. The output of inverter 218 is connected through a resistor 226 to the inverting input of amplifier 219.

To insure that the circuits of the test unit are referenced to the same level as the circuits of the metal detector, the pseudo ground at junction 89 (FIG. 2) of the metal detector is applied to the test unit circuits. For circuit protection purposes the junction 89 is connected through a voltage follower 228 (FIG. 2) and a current limiting resistor 230 to a lead 232. This lead is connected via socket 44 and plug 48 (FIG. 5) to a buffer 234. The output of buffer 234 is connected over leads 236, 238, 240 and 242 to various elements of the test unit as subsequently described and serves as a pseudo ground or reference level which is the same as the reference level within the metal detector.

In FIG. 6, the pseudo ground level is connected by lead 236 to the non-inverting input of amplifier 218 and through resistors 244 and 246 to +5V. The non-inverting inputs of amplifiers 219 and 220 are connected to the junction between resistors 244 and 246. A lead 248 is connected to this junction and provides the reference voltage input to the right channel amplifiers corresponding to amplifiers 219 and 220.

The outputs of amplifiers 219 and 220 are connected through diodes 250 and 252 to the non-inverting inputs of rectifying amplifiers 254 and 256 respectively. Diodes 258 and 260 connect the outputs of amplifiers 254 and 256, respectively, to a junction 262. The junction 262 is similarly connected to diodes 264 and 266 which are a portion of the right channel rectifier 206.

As shown in FIG. 5, the outputs of the full wave rectifiers 202 and 206 are applied to a peak hold circuit 268. This circuit has a fast-attack, slow-release characteristic so that it effectively samples the outputs of the rectifiers 202 and 206 and holds the maximum voltage from either rectifier. In FIG. 6 the peak hold circuit comprises a capacitor 270, a resistor 272 and a voltage follower 274. Capacitor 270 is connected at one side to junction 262 and at the other side to lead 240 which is tied to the pseudo ground output of buffer 234. The non-inverting input of voltage follower 274 is connected to junction 262 and the output of the voltage follower is connected back to the inverting inputs of the rectifying amplifiers 254 and 256 in the right and left channels. The resistor 272 is connected at one side to junction 262 and at the other side is connected by a lead 276 to the output of a voltage follower 278 (FIG. 5).

The output of voltage follower 278 is determined in part by the pseudo ground output of buffer 234. A voltage divider circuit extends from +5V, a resistor 280, a resistor 282 and a lead 236 to the output of buffer 234. The junction 284 between resistors 280 and 282 is connected to the input of amplifier 286 and the output of amplifier 286 is connected through a diode 288 to the input of voltage follower 278 and a junction 290. The junction 290 is connected through a resistor 292 to logic ground and through a resistor 294 to the output lead 296 from the peak hold circuit 268.

The waveforms 300, 302 and 304 (FIG. 5) illustrate the outputs of buffer 201 (or 204), rectifier 202 (or 206) and peak hold circuit 268 if a sine wave signal should be applied to the left (or right) channel of the test unit. The broken horizontal line in these waveforms represents the pseudo ground reference level.

The output lead 296 from the peak hold circuit 268 is connected to a bar graph driver 306. The bar graph driver may be a National Semiconductor type LM 3914 driver. The driver has outputs connected to the LEDs 1-8 which are visible on the front of the test unit 50 (FIG. 1). The driver circuit causes one or more of the LEDs to be lit depending upon the magnitude of the signal on lead 296 relative to the pseudo ground reference level on lead 242. As a typical example, circuit parameters may be chosen such that when signal generating unit 52 is in place and generates a pulsating magnetic field of a predetermined intensity, the output of peak hold circuit 268 is such that LEDs 1-7 remain fully lit while LED 8 is off or flickers at the 7Hz rate.

Figure 7:
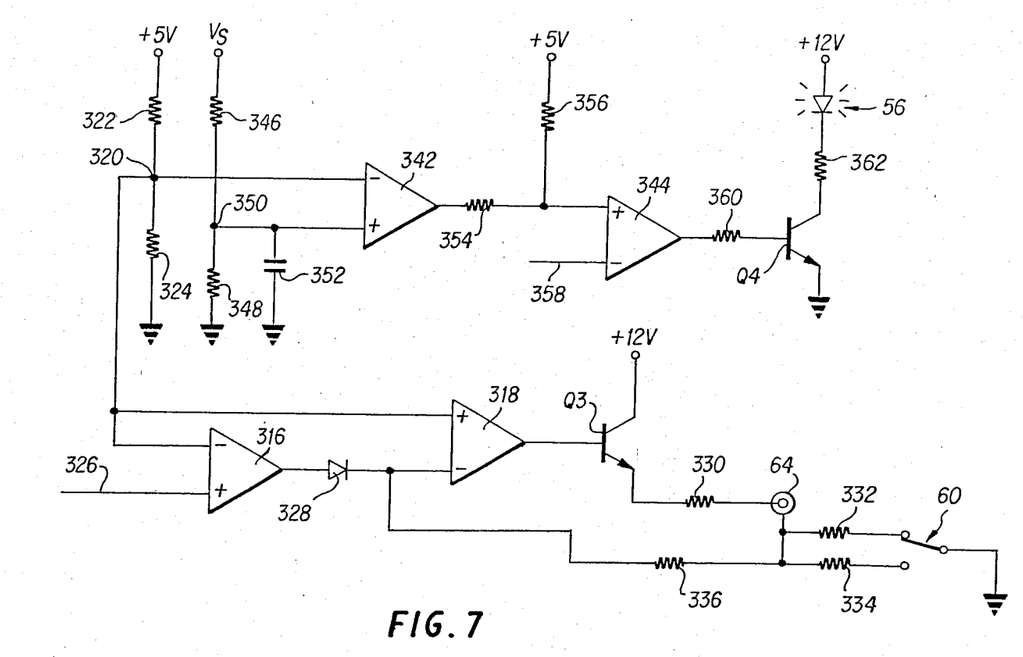

The test unit includes a 7Hz oscillator 308 (FIG. 5) which feeds a constant current coil driver circuit 310. The output of the driver circuit 310 is connected to the phono jack 64 and the cable from the signal generating unit 52 is plugged into the jack so that the output of the driver circuit drives a coil 314 within the signal generating unit thereby generating a pulsating magnetic field of predetermined intensity in the region of the coil. The coil driver circuit 310 is illustrated in FIG. 7 and includes comparator 316, amplifier 318 and a transistor driver Q3. The inverting input of comparator 316 and the non-inverting input of amplifier 318 are connected to a reference voltage at junction 320 between two series connected resistors 322 and 324. The output of oscillator 308 is connected by a lead 326 to the non-inverting input of comparator 316 and the output of comparator 316 is connected through a diode 328 to the inverting input of amplifier 318.

The output of amplifier 318 is connected to the base of transistor driver Q3. The collector of Q3 is connected to +12V and the emitter is connected through a resistor 330 to the center connector of phono jack 64. The outer connector of the phono jack is connected to the model select switch 60 through two resistors 332 and 334 and to the inverting input of amplifier 318 through a resistor 336.

During the low half cycle of the output of oscillator 308 the low level output of comparator 316 is blocked by diode 328. Amplifier 318 and transistor Q3 form a voltage follower circuit so that current flows from +12V, Q3, resistor 330, phono jack 64 and a connecting cable 54 (FIG. 5) to the coil 314 within signal generating unit 52. From coil 314 the current flow path extends back through cable 54, phono jack 64, one of the resistors 332 or 334 and switch 60 to ground. During the positive half cycle of oscillator 308 the diode 328 passes the positive output of comparator 316 causing amplifier 318 to produce a low output signal. This turns Q3 off and blocks the flow of current to coil 314.

The pulsating current pulse flow through coil 314 generates a pulsating magnetic field which is sensed by one of the metal detector sensing coils 68 or 70 (FIG. 2). For a sensitivity test it is necessary to generate a "standard" or predetermined intensity pulsating magnetic field in the region of coils 68,70. Some model harvesters have larger lower front feed rolls than others hence there is a greater distance between the field generating coil 314 and the sensing coils 68,70 of the metal detector when the coil 314 is placed against the outer surface of the feed roll. The model switch 60 and the 22 and 43 ohm resistors 332 and 334 provide a means for selectively varying the peak amplitude of the pulsating current flow through coil 314 thereby varying the intensity of the pulsating magnetic field generated by the coil. The test unit operator may thus set switch 60 to a first or a second position and thereby test the sensitivity of a metal detector in a first or a second type of harvester. Obviously, an N-position switch may be utilized with N resistors to permit testing of N different harvester models.

The level detector 340 (FIG. 5) is also shown in FIG. 7 and comprises a comparator 342, a comparator 344 and a transistor driver Q4. The purpose of the level detector is to detect when the output of the tractor battery 36 drops below a usable operating level, i.e. a level which is necessary for proper circuit operation.

The inverting input of comparator 342 is connected to junction 320. The resistor 324 is 10K and the value of resistor 322 is selected at factory test time such that the voltage at junction 320 is about 580mV. The battery power supply $V_s$ is connected to ground through a voltage divider comprising a resistor 346 and a resistor 348 and the non-inverting input of comparator 342 is connected to the junction 350 between the resistors. The output of comparator amplifier 342 is connected through a resistor 354 to the non-inverting input of comparator 344. This comparator input is also connected to +5V through a resistor 356. The 7Hz output from oscillator 308 is applied over a lead 358 to the inverting input of comparator 344. The output of comparator 344 is connected through a resistor 360 to the base of grounded emitter transistor Q4. The collector of Q4 is connected through a resistor 362 and the "power on" LED 56 to +12V.

The level detector circuit operates as follows. As long as $V_s$ is above 11.25V the output of comparator 342 is at a level which causes comparator 344 to produce a positive output signal regardless of the magnitude of the oscillator signal on lead 358. Transistor Q4 thus conducts steadily and current flow through LED 56 causes it to be steadily lit. If $V_s$ should drop below about 11.25V then the output from comparator 342 drops to a lower level. This causes comparator 344 to produce a low level output signal on each positive half cycle of the oscillator signal on lead 358. The low level output from comparator 344 thus turns off transistor Q4 and LED 56 on alternate half cycles at a 7Hz rate. The flashing LED provides an indication to the operator that the battery 36 is no longer suitable for operating the circuits.

The test unit 50 also includes a detector/driver circuit means 364 (FIG. 5) which is used in combination with the three-position pawl switch 62 to test for proper operation of the solenoid-actuated pawl 28 (FIG. 1). The detector/drive circuit 364 may be constructed in the same manner as the detector/driver circuit 110 employed in the metal detector and illustrated in FIG. 4. However, the detector/drive circuit 364 has no input corresponding to the input lead 108. The single shot multivibrator of the detector/drive circuit 364 is connected to pseudo ground by a lead 238 (FIG. 5) and the output of circuit 364 (corresponding to lead 126 of FIG. 4) is connected by a lead 366 to one side of pawl switch contacts 62a. One side of switch contacts 62b is left unconnected and one side of switch contacts 62c is connected to the plug 48 so that when the plug is inserted into socket 44 the output signal produced by the metal detector on lead 126 is applied to contacts 62c.

At the other side, contacts 62a, 62b and 62c are connected in common to plug 48 so that when plug 48 is inserted into socket 44 the contacts are connected to the lead 166. This lead is connected through wiring harness 30 (FIG. 1) and connectors 32 and 40 to the coil of the control relay in control box 38 which controls the application of battery power to the solenoid-actuated pawl 28 and to the visual and audible alarms in the control box.

The detector/driver circuit 364 is utilized as follows. When the plug 48 is inserted in socket 44 the voltage $V_s$ from power supply 200 is applied to the drive transistor in circuit 364 which corresponds to Q2 of FIG. 4. The single shot multivibrator of the circuit 364 (corresponding to SSMV 112 of FIG. 4) produces an output which enables this drive transistor to conduct. A circuit is thus established from $+V_s$ through the drive transistor and lead 366 to contacts 62a. An operator may manually actuate switch 62 so that the contacts 62a and 62b are alternately closed. When contacts 62a are closed current flows through the contacts and over lead 166 to the control box 38 where it passes through the coil of the control relay to ground. The relay is energized and closes a set of normally open contacts thereby connecting power from tractor battery 36 to the solenoid of the solenoid-actuated pawl 28. At the same time, the control relay opens the circuit from battery 36 to the visual and audible alarms. When switch 62 is set to close contacts 62b, the circuit from lead 366 to lead 166 is opened. Since one side of contacts 62b is left open, there is no current flow through lead 166. Therefore, the control relay drops out and this in turn deenergizes solenoid actuated pawl 28 so that its associated spring drives the pawl into engagement with the ratchet in the feed roll drive train. At the same time, the control relay connects battery 36 to the audible and visual alarms. Thus, an operator may test for the correct operation of the control relay and the solenoid actuated pawl 28 by flipping switch 62 to open contacts 62a and close contacts 62b while listening for the sound of the audible alarm or observing the visual alarm in the control box. The control box 38 contains an interlock circuit which must be reset by "reversing" the feed roll drive before the pawl 28 can be reenergized. Thus, when switch 62 is set to its "b" position, the pawl engages the ratchet in the drive train and remains engaged even if switch 62 is returned to its "a" position. To repeat the test using switch 62, the feed rolls must be run in the reverse direction to reset the pawl 28.

The detector/driver circuit also tests for a short in the control relay winding. In case of a short the excessive current flow through the resistor in circuit 364 (corresponding to resistor 124 of FIG. 4) causes the immediate triggering of the multivibrator (corresponding to multivibrator 112) and the output of the multivibrator will cut off the transistor in circuit 364 corresponding to Q2 of FIG. 4. With the transistor cut off, current flow to the control relay in control box 38 terminates. The control relay drops out thereby applying battery power to the audible and visual alarms in the control box.

For the convenience of the operator the "detection" LED 58 is placed on the test unit 50 so that the operator does not have to be in the vicinity of the control box to observe that the metal detector is producing an output signal. The signal on lead 126 from the metal detector is applied to a voltage divider comprising two equal resistors 370 and 372. The junction between the resistors is connected to the inverting input of a comparator 376. The non-inverting input of comparator 376 is connected to pseudo ground lead 236 and the output of the comparator is connected through a resistor 378 to the base of a grounded emitter transistor Q5. The collector of Q5 is connected to +12V through a resistor 380 and the detection LED 58.

If a check of the sensitivity of a metal detector is made, it should be made for the nominal sensitivity. Therefore, the test unit 50 includes a 3K resistor 390 which is connected to plug 48 so that when the plug is inserted into socket 44 the resistor 390 is connected to the junction points 93 and 94 (FIG. 2) by way of leads 150 and 152.

In making a sensitivity check the signal generating unit 52 should be positioned axially along the lower front feed roll 12 so that the pulsating magnetic field which it generates has maximum influence on the sensing coils (68,70) of the metal detector. This axial location varies according to the configuration of the sensing coils and various types of sensing coils are employed in different models of metal detectors. Therefore, instructions provided with the test unit should specify the axial location of the signal generating unit on the feed roll for the different metal detector models.

Since the metal detector illustrated in FIG. 2 has two sensing coils which are positioned differently along the axis of the feed roll so as to detect metal objects passing over the feed roll at any axial location, it is necessary to conduct the sensitivity check by first positioning the signal generating unit 52 to obtain the maximum output signal from one channel and then moving the signal generating unit 52 to a second position along the feed roll in order to obtain the maximum output signal from the second channel. Obviously, this procedure is not necessary if the metal detector should have only one sensing coil 68 or 70.

While a preferred embodiment of the invention has been described in specific detail, it will be understood that various substitutions and modifications may be made in the described embodiment without departing from the spirit and scope of the invention. For example, the principles of the present invention are equally adaptable for testing metal detectors which are located at positions other than in a feed roll of a harvester. Furthermore, in some instances where the metal detector is inside a feed roll it may be convenient to perform the sensitivity test with the signal generating unit inside the feed roll. Therefore, it is intended that the invention be limited only by the scope of the appended claims.

The embodiments of the invention in which an exclusive property or privilege is claimed are defined as follows:

1. A method of testing the sensitivity of a metal detector of the type having magnet means for generating a magnetic field and a sensing means for sensing the variation in said magnetic field caused by the movement of a ferrous metal object through said field, said method comprising:
    disposing a signal unit having a magnetic field generator in the vicinity of said sensing means and moving it to and fro;
    energizing said magnetic field generator with a sub-audio pulsating signal of predetermined magnitude whereby a magnetic field of predetermined intensity is generated in the region of said sensing means to cause said sensing means to produce an output signal which should be greater than a first magnitude but less than a second magnitude;
    applying said output signal to an indicator means of a type capable of visually indicating the magnitude of the signal applied thereto; and,
    observing said indicator means to determine if the magnitude of said output signal is greater than said first magnitude but less than said second magnitude.

2. A method as claimed in claim 1 for testing the sensitivity of a metal detector disposed within a feed roll of a harvester, said step of disposing said magnetic field generator in the vicinity of said sensing means comprising placing said magnetic field generator on the outer surface of said feed roll.

3. The method as claimed in claim 2 wherein said magnetic field generator is manually placed on the outer surface of said feed roll and said feed roll is rotated to and fro with said magnetic field generator.

4. The method as claimed in claim 1 for testing a metal detector of the type in which the sensitivity may be varied by changing a resistance in the metal detector circuit, said method further comprising inserting in said metal detector circuit a nominal resistance of known value.

5. Apparatus for testing the sensitivity of a metal detector of the type having magnet means for generating a magnetic field, a sensing means for sensing the variations in said magnetic field caused by the movement of a ferrous metal object through said field, and circuit means responsive to said sensing means for producing an output signal, said apparatus comprising:
    a magnetic field generator disposed in the vicinity of said sensing means;
    means for energizing said magnetic field generator with a sub-audio signal of predetermined magnitude whereby a magnetic field of predetermined intensity is generated in the region of said sensing means to cause said circuit means to produce an output signal which should be within a predetermined range of magnitudes said magnetic field generator being manually movable to and fro in the vicinity of said sensing means;
    a visual indicator means of a type capable of indicating the magnitude of an input signal applied thereto; and,
    circuit means responsive to said output signal for applying an input signal to said visual indicator means whereby a visual observation of said visual indicator means may be made to determine if the magnitude of said output signal is within said predetermined range of magnitudes, the magnitude of said output signal being proportional to the sensitivity of said metal detector.

6. Apparatus as claimed in claim 5 for testing the sensitivity of a metal detector disposed within a feed roll of a harvester, said magnetic field generator comprising a manually movable element which may be moved to and fro about the periphery of said feed roll.

7. Apparatus as claimed in claim 5 wherein said means for energizing said magnetic field generator comprises means for applying a pulsating signal of predetermined maximum amplitude to said magnetic generator.

8. Apparatus as claimed in claim 7 wherein said means for applying a pulsating signal to said magnetic field generator includes at least first and second sources producing first and second sub-audio signals, each having a predetermined maximum amplitude; and switch means connected between said sources and said magnetic field generator so that either said first or second signal may be selectively applied to said magnetic field generator.

9. Apparatus as claimed in claim 5 wherein said visual indicator means comprises a bar graph driver for receiving said output signal and a plurality of visual indicators connected to said bar graph driver and energized thereby.

10. Apparatus as claimed in claim 5 wherein said circuit means comprises:
    rectifier means responsive to said output signal for producing a rectified output signal; and,
    a peak hold circuit for receiving said rectified output signal, said peak hold circuit having an output connected to said visual indicator means.

11. A portable testing apparatus for in situ testing of one of a plurality of metal detectors of the type which detect metal objects in a moving stream of material, said metal detector apparatus having first means for producing a magnetic field in a region through which said material moves, sensing means for sensing variations in said magnetic field; processor circuit means responsive to said sensing means for producing a detection signal and at least one channel signal, signalling means responsive to said detector means for signalling that a metal object has been detected, and connecting means including first and second separable connectors for connecting said processor circuit means to said signalling means, said portable testing apparatus comprising:
    a signal generating unit positionable in a region near said sensing means for generating a magnetic field which may be sensed by said sensing means of the one one metal detector being tested; and, a test unit including, first means for applying a pulsating signal of a predetermined magnitude to said signal generating unit whereby said signal generating unit generates a pulsating magnetic field of predetermined intensity which is sensed by the sensing means of the metal detector being tested;

test circuit means;

means including a third separable connector interchangeable with said second separable connector for mating with said first separable connector to thereby connect said processor circuit means to said test circuit means so that said channel signal is applied to said test circuit means when said third separable connector is interchanged with said second separable connector and mated with said first separable connector, said test circuit including means producing a measurement signal having a magnitude dependent on the magnitude of said channel signal; and, visual indicator means connected to said test circuit means and responsive to said measurement signal for indicating the magnitude of said channel signal and thereby the sensitivity of said metal detector apparatus, said portable testing apparatus being separable from or connectable to a metal detector apparatus being tested by separating or connecting said first and third separable connectors.

12. A portable testing apparatus as claimed in claim 11 wherein a battery is normally connected to said processor circuit means through said first and second separable connectors; and, means for providing operating voltages for said test circuit means and said visual indicator means;

said third separable connector also connecting said battery to said processor circuit means and said means providing operating voltages whereby said test apparatus is also powered by the battery which provides power to the processor circuit means when said first and third separable connectors are mated.

13. A portable testing apparatus as claimed in claim 11 wherein said test unit includes a manual switch having first and second contacts connected to said third separable connector so that said first contact is connected to said processor circuit means to receive said detection signal and said second contact is connected to said signalling means when said third separable connector is mated with said first separable connector whereby said detection signal may be selectively applied to said signalling means upon manual actuation of said switch.

14. A portable testing apparatus as claimed in claim 11 for testing a metal detector apparatus of the type wherein the sensing means includes two sensing coils and the processor circuit means includes means connected to said coils for producing first and second channel signals, said means for producing a measurement signal comprising:

first and second rectifier circuits connected to said third separable connector for receiving said first and second channel signals when said first and third separable connectors are mated and producing rectified output signals; and, a peak hold circuit responsive to said rectified output signals for producing said measurement signal.

15. A portable testing apparatus as claimed in claim 14 for testing metal detectors disposed in the feed rolls of harvesters, said signal generating unit being manually positionable on the periphery of one of said feed rolls to generate a pulsating magnetic field near one or the other of said two sensing coils.

16. Apparatus for testing the sensitivity of a metal detector of the type which detects the movement of metal objects in a moving stream of material, said metal detector apparatus having magnet means for producing a magnetic field in a region through which said material moves, first and second sensing means, differently positioned relative to said magnet means, for sensing variations in said magnetic field, and processor circuit means having first and second channel means responsive to said first and second sensing means, respectively, for producing first and second channel signals corresponding to the variations sensed by said first and second sensing means, respectively, said apparatus comprising:

a signal generating unit manually positionable and movable to and fro in a region near said first or said second sensing means for generating a magnetic field which may be sensed by said first or said second sensing means; and, a test unit including, first means for applying a sub-audio signal of a predetermined magnitude to said signal generating unit whereby said signal generating unit generates a pulsating magnetic field of predetermined intensity;

test circuit means for receiving said first and said second channel signals and producing a measurement signal having a magnitude proportional to said first and second channel signals; and, indicator means for visually displaying an indication of the magnitude of said measurement signal, whereby the sensitivity of said first sensing means and said first channel means, or said second sensing means and said second channel means may be observed by positioning said signal generating unit in the region of said first or said second sensing means, respectively, and observing said indicator means as said signal generating unit is moved to and fro.

17. A testing apparatus as claimed in claim 16 wherein said metal detector includes a first separable connector and said test unit includes a second separable connector which may be mated with said first separable connector, said first and second channel signals being applied through said first and second separable connectors to said test circuit means.

18. A testing apparatus as claimed in claim 17 for testing a metal detector wherein said first and second channel means each have an input connected to said first separable connector, an impedance between said first and second channel inputs determining the nominal sensitivity of the metal detector, said test unit further including a resistor connected to said second separable connector so that when said first and second separable connectors are mated, said resistor is connected as the impedance between said first and second channel inputs to set the nominal sensitivity of the metal detector.

* * * * *